(12) United States Patent
Chern (10) Patent No.: US 8,266,987 B1
(45) Date of Patent: Sep. 18, 2012

(54) RATCHET TOOL SUITABLE FOR COOPERATING WITH THREAD FORMING TAPS

(76) Inventor: Shwu Ruu Chern, Taichung (TW)

( * ) Notice: Subject to any disclaimer, the term of this patent is extended or adjusted under 35 U.S.C. 154(b) by 328 days.

(21) Appl. No.: 12/799,604

(22) Filed: Apr. 28, 2010

(51) Int. Cl.
*B25B 13/46* (2006.01)
(52) U.S. Cl. .......................................................... 81/60
(58) Field of Classification Search ................ 81/60–63, 81/63.1, 63.2, 63.3, 177.85, 58.2
See application file for complete search history.

(56) References Cited

U.S. PATENT DOCUMENTS

| | | | | |
|---|---|---|---|---|
| 4,934,220 A * | 6/1990 | Slusar et al. | ................... | 81/63.2 |
| 6,260,448 B1 * | 7/2001 | Chaconas | ........................ | 81/63 |
| 6,655,237 B2 * | 12/2003 | Chen | ................................. | 81/60 |
| 7,311,019 B2 * | 12/2007 | Arnold et al. | ................... | 81/63.2 |
| 7,353,735 B2 * | 4/2008 | Patel et al. | ........................ | 81/63 |
| 7,441,482 B2 * | 10/2008 | Lin | .................................... | 81/62 |
| 8,109,180 B2 * | 2/2012 | Hu | .................................... | 81/60 |

* cited by examiner

*Primary Examiner* — Robert Pezzuto
(74) *Attorney, Agent, or Firm* — Pro-Techtor Int'l Services (57) ABSTRACT

A ratchet tool includes a head and a handle extends from a first end of the head and an extension rod is removably connected to a second end of the head. A connection member is connected to the head and includes a slot in which two blocks are movably received therein. Each block includes a clamping face so as to clamp a thread forming tap therebetween. A cover has a hole defined centrally therethrough and two guide ways are defined through the cover. Two pins are connected to the two blocks and slidably extend through the two guide ways. When rotating the head, the two blocks are moved toward to clamp the thread forming tap which is rotated with the rotation of the head. An adapter is connected the head and located opposite to the connection member. The adapter is connected with socket or bit.

7 Claims, 8 Drawing Sheets

RATCHET TOOL SUITABLE FOR COOPERATING WITH THREAD FORMING TAPS

FIELD OF THE INVENTION

The present invention relates to a ratchet tool, and more particularly, to a ratchet tool that can be used to cooperated with a thread forming tap.

BACKGROUND OF THE INVENTION

Figure 8A:
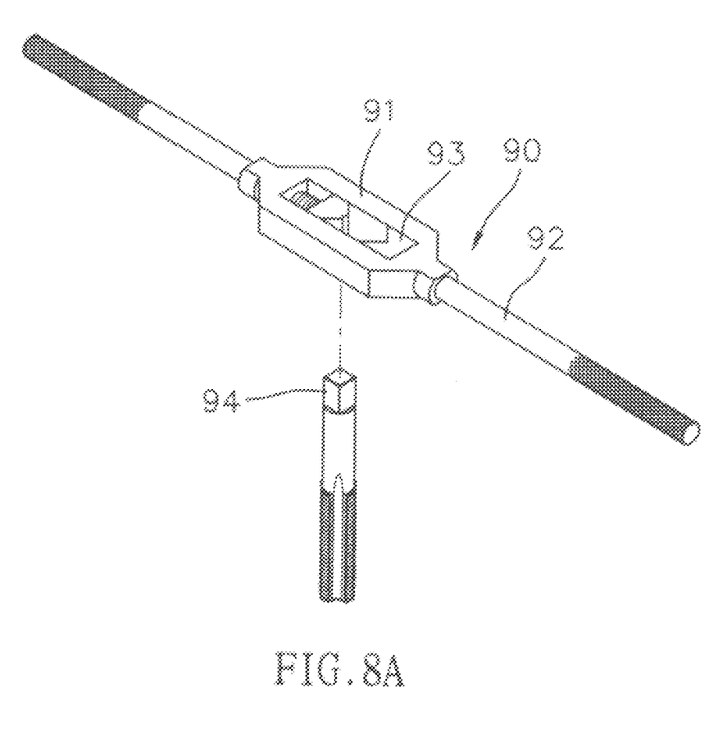
FIG. 8A shows a conventional tool and a thread forming tap.
Figure 8B:
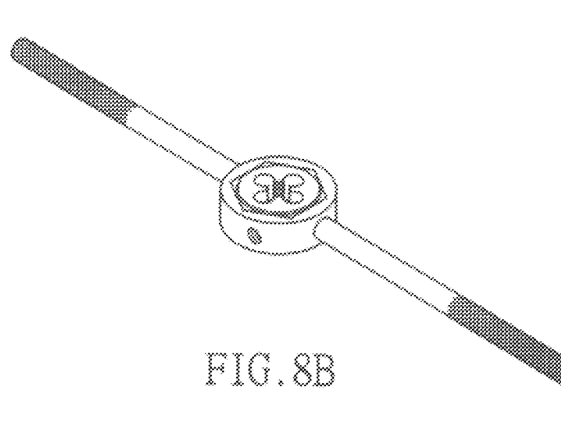
FIG. 8B shows another type of thread forming tap and the conventional tool.

A conventional tool 90 for forming a threaded hole y using a thread forming tap is shown in FIG. 8A, and generally includes a frame 91 and two rods 92 are connected to two ends of the frame 91. Each rod 92 is connected with a block 93 located in the frame 91. The thread forming tap 94 has its end clamped between the two blocks 93 and the user holds the two rods 92 to tap an object to form a threaded hole. FIG. 8B shows another type of tap connected with two rods and is similar to the tool disclosed in FIG. 8A. However, the tool can only be used with the thread forming tap 94 and cannot be used to fasten or loosen a threaded object such as a screw. Therefore, a ratchet tool for fastening or loosening a threaded object is needed and this means an extra expense is required.

The present invention intends to provide a ratchet tool that can be used to cooperate with a thread forming tap and can be used as a fastening or loosening tool.

SUMMARY OF THE INVENTION

The present invention relates to a ratchet tool which comprises a head and a handle extends from a first end of the head. A first connection portion is connected to a first side of the head so as to be connected with a second connection portion on a connection member. A passage is defined through the connection member and a slot is defined in a second side of the connection member. Two parts are formed and separated by the slot. Each of the two parts has a recess defined therein. Two guide grooves are defined in two insides of the slot.

A first block has a first rail which is slidably engaged with, one of the two guide grooves so that the first block is movably located in the slot. The first block has a first face defined in an end thereof and a first pin extends through a first pin hole in the first block. A second block has a second rail which is slidably engaged with the other one of the two guide grooves so that the second block is movably located in the slot. The second block has a second face defined in an end thereof. A second pin extends through a second pin hole in the second block. A ring is threadedly connected to outside of the connection member. A cover has a hole defined centrally therethrough and includes two guide ways. The first and second pins slidably extend through the two guide ways. Two biasing sets are received in the recesses and contact the cover.

The primary object of the present invention is to provide a ratchet tool that can be cooperated with a thread, forming tap and can be used to fasten or loosen an object.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
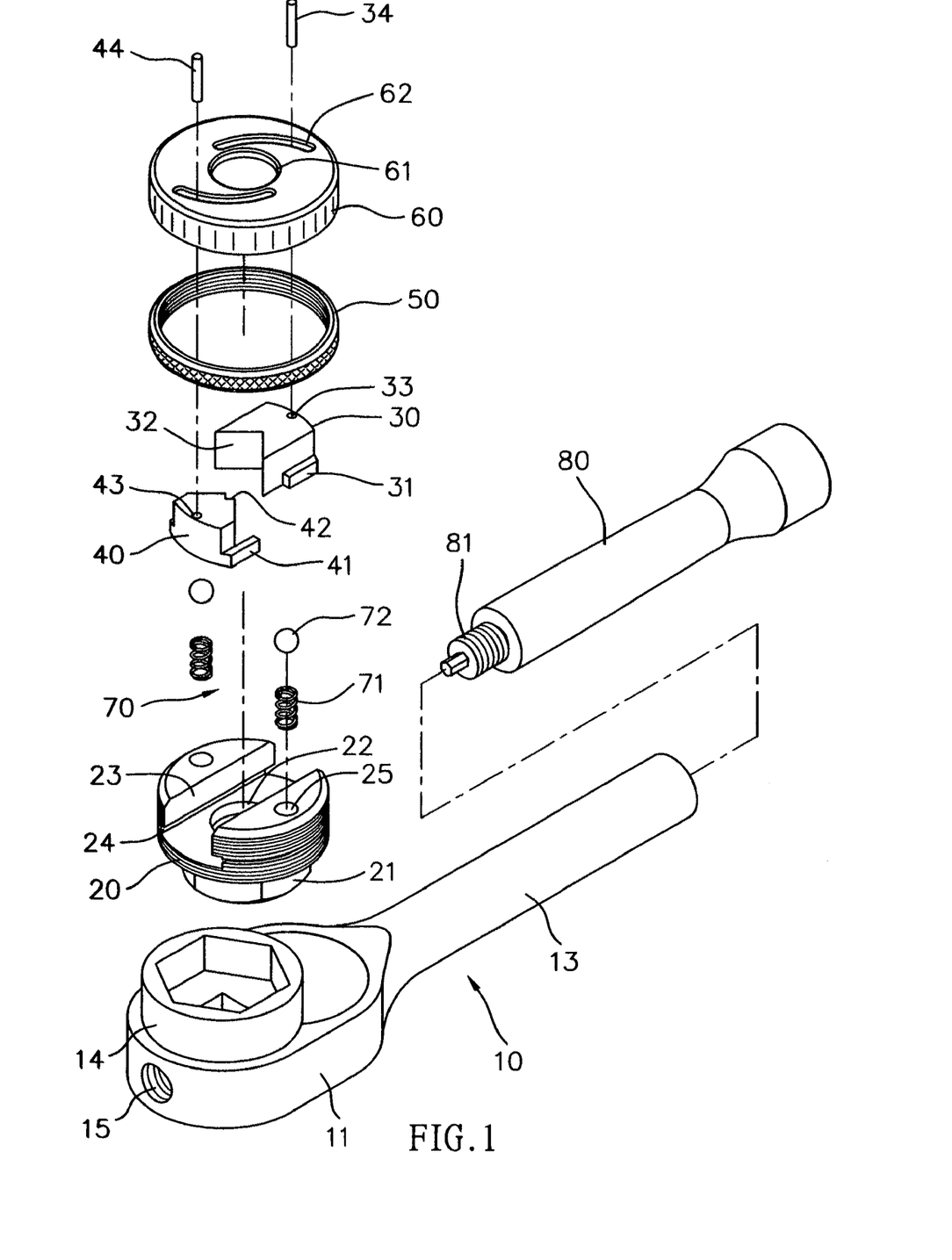
FIG. 1 is an exploded view to show the ratchet tool of the present invention.
Figure 2:
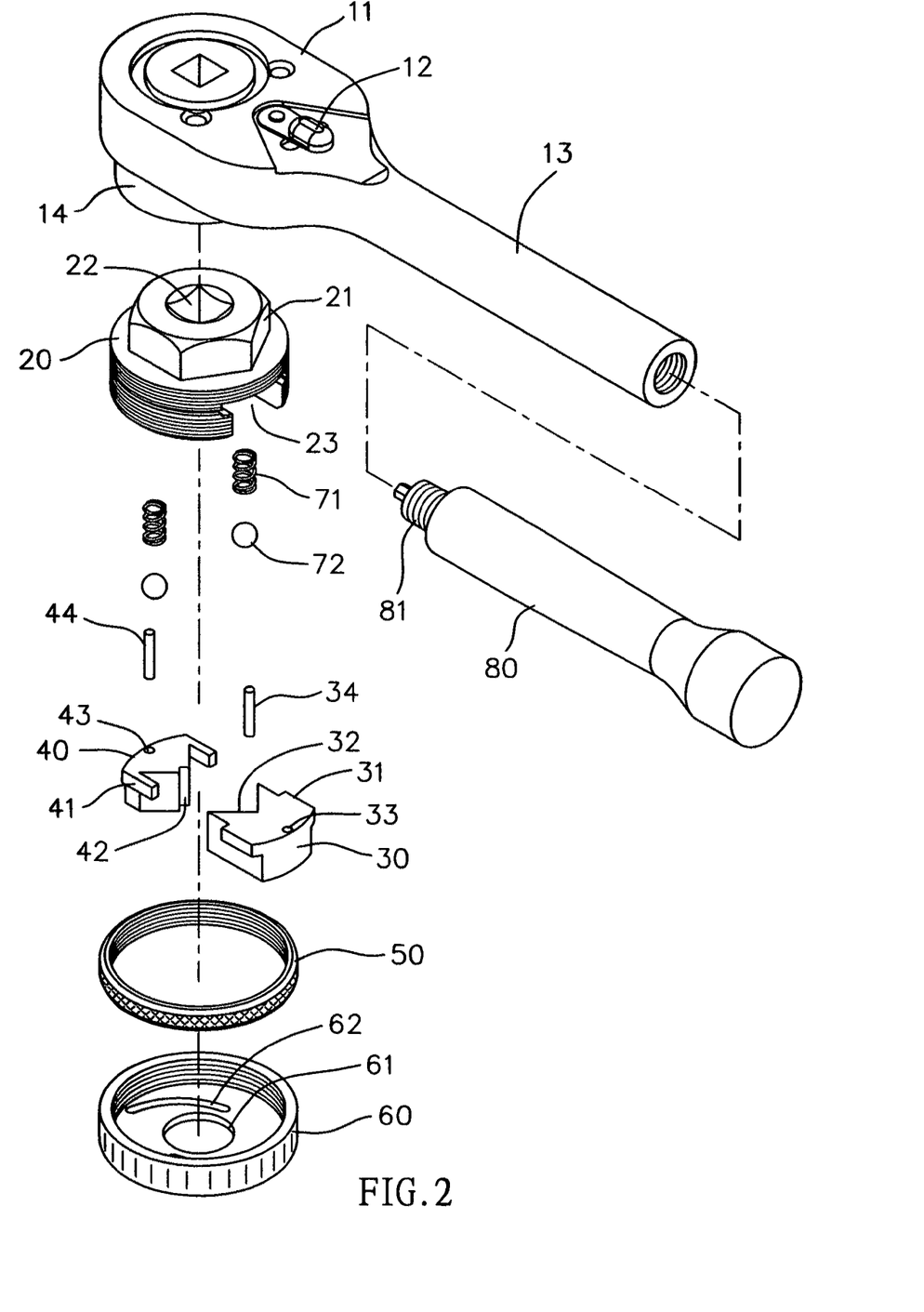
FIG. 2 is another exploded view to show the ratchet tool of the present invention.
Figure 3:
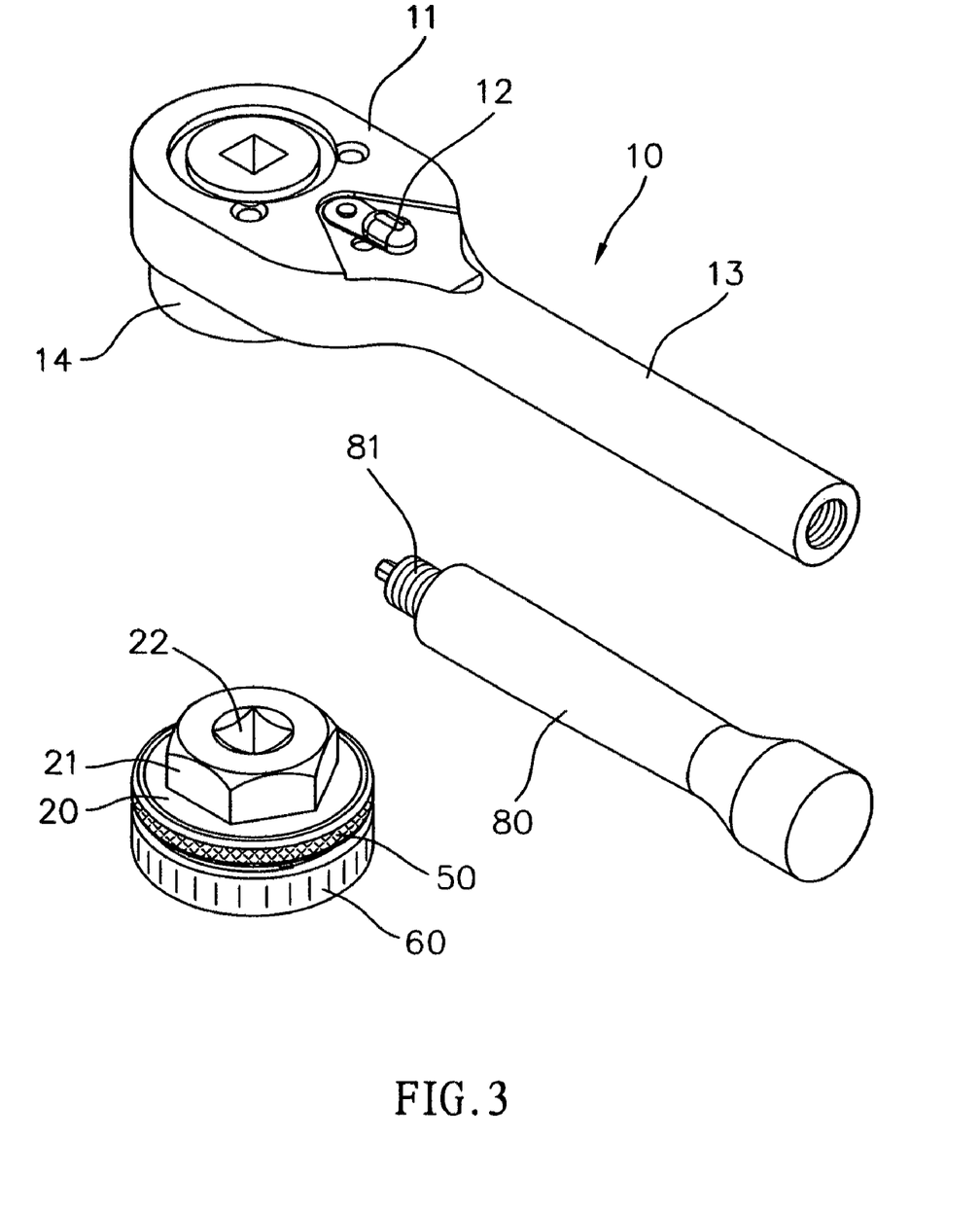
FIG. 3 shows that the connection member is to be connected to the head of the ratchet tool of the present invention.
Figure 4:
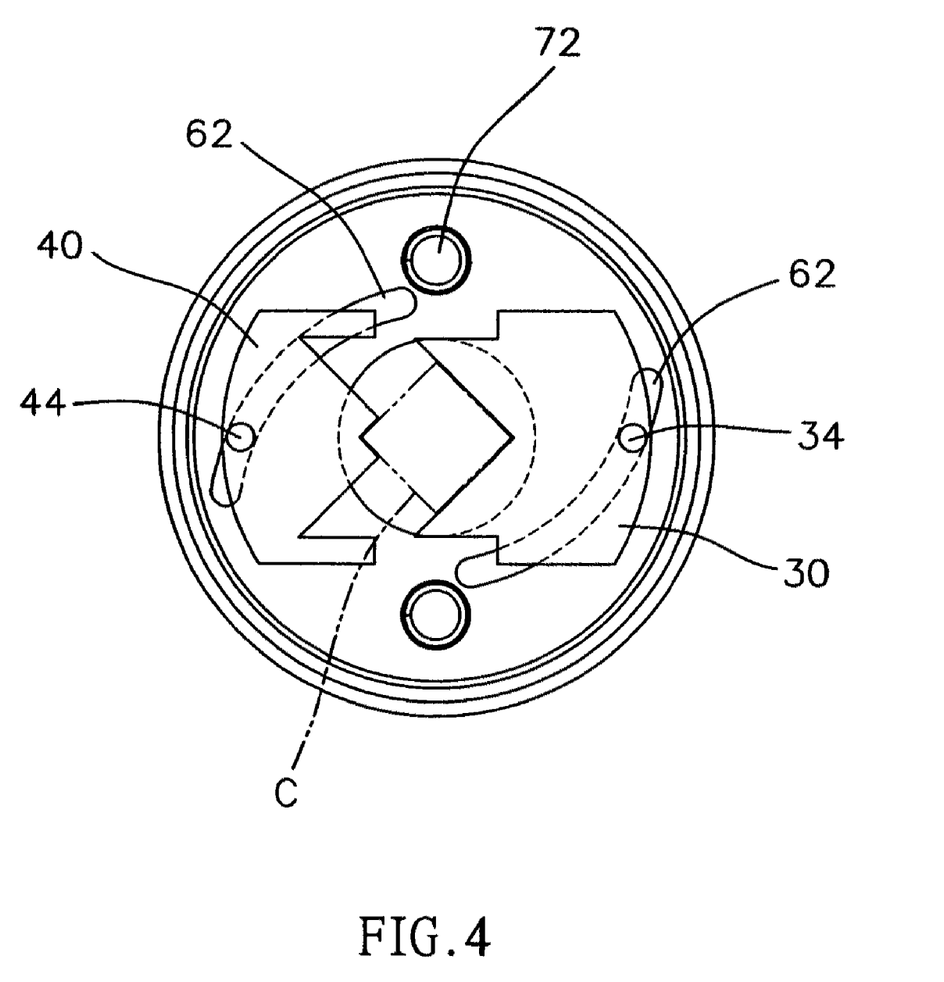
FIG. 4 shows that the two blocks are moved toward each other and the two pins moved in the guide ways.

Referring to FIGS. 1 to 3, the ratchet tool 10 of the present invention comprises a head 11 and a handle 13 extends from a first end of the head 11. The head 11 has a ratchet mechanism received therein which is not shown, and a first connection portion 14 is connected to a first side of the head 11. The first connection portion 14 has a hexagonal recess. A switch lever 12 is connected to a second side of the head 11 and controls the ratchet mechanism in the head 11.

A connection member 20 has a second connection portion 21 on a first side thereof and the second connection portion 21 is a hexagonal protrusion which is connected to hexagonal recess in the first connection portion 14. A passage 22 is defined through the connection member 20 and a slot 23 is defined in a second side of the connection member 20. Two parts are formed and separated by the slot 23. Each of the two parts has a recess 25 defined therein and two guide grooves 24 are defined in two insides of the slot 23.

A first block 30 has a first rail 31 which is slidably engaged with one of the two guide grooves 24 so that the first block 30 is movably located in the slot 23. The first block 30 has a first face 32 defined in an end thereof. A first pin 34 extends through a first pin hole 33 in the first block 30. A second block 40 has a second rail 41 which is slidably engaged with the other one of the two guide grooves 24 so that the second block 40 is movably located in the slot 23. The second block 40 has a second face 42 defined in an end thereof. A second pin 44 extends through a second pin hole 43 in the second block 40. A ring 50 is threadedly connected to outside of the connection member 20 and a cover 60 is threadedly to the connection member 20 and located adjacent to the ring 50. The cover 60 has a hole 61 defined centrally therethrough and includes two curved guide ways 62. The first and second pins 34, 44 slidably extend through the two guide ways 62.

Two biasing sets 70 are received in the recesses 25 and each of the biasing sets 70 includes a resilient member 71 and a contact member 72. The resilient member. 71 is a spring which biases the contact member 72 which is a steel ball and contacts the cover 60.

Figure 5:
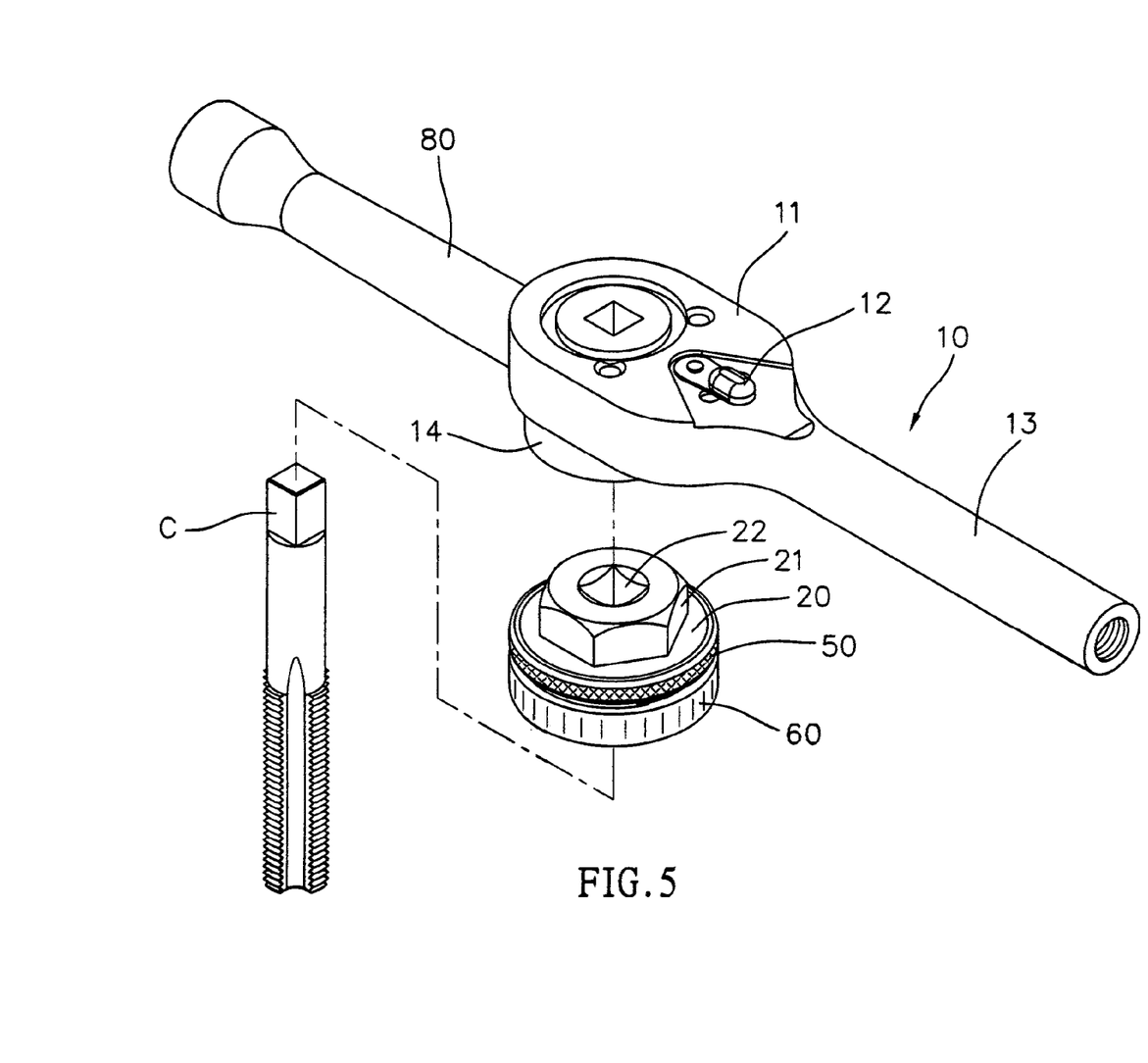
FIG. 5 is an exploded view to show the ratchet tool of the present invention and a thread forming tap.

As shown in FIG. 5, an extension rod 80 includes a threaded section 81 extending from an end thereof and a threaded hole 15 is defined in a second end of the head 11. The threaded section 81 is threadedly connected to the threaded hole 15 so that the user can hold the handle 13 and the extension rod 80 to operate a thread forming tap "C" which is clamped between the first and second faces 32, 42 of the first and second blocks 30, 40. When rotating the ratchet tool 10, the first and second blocks 30, 40 are moved toward each other and the first and second pins 34, 44 are moved along the two curved guide ways 62 in the cover 60 to clamp the thread forming tap "C".

Figure 6:
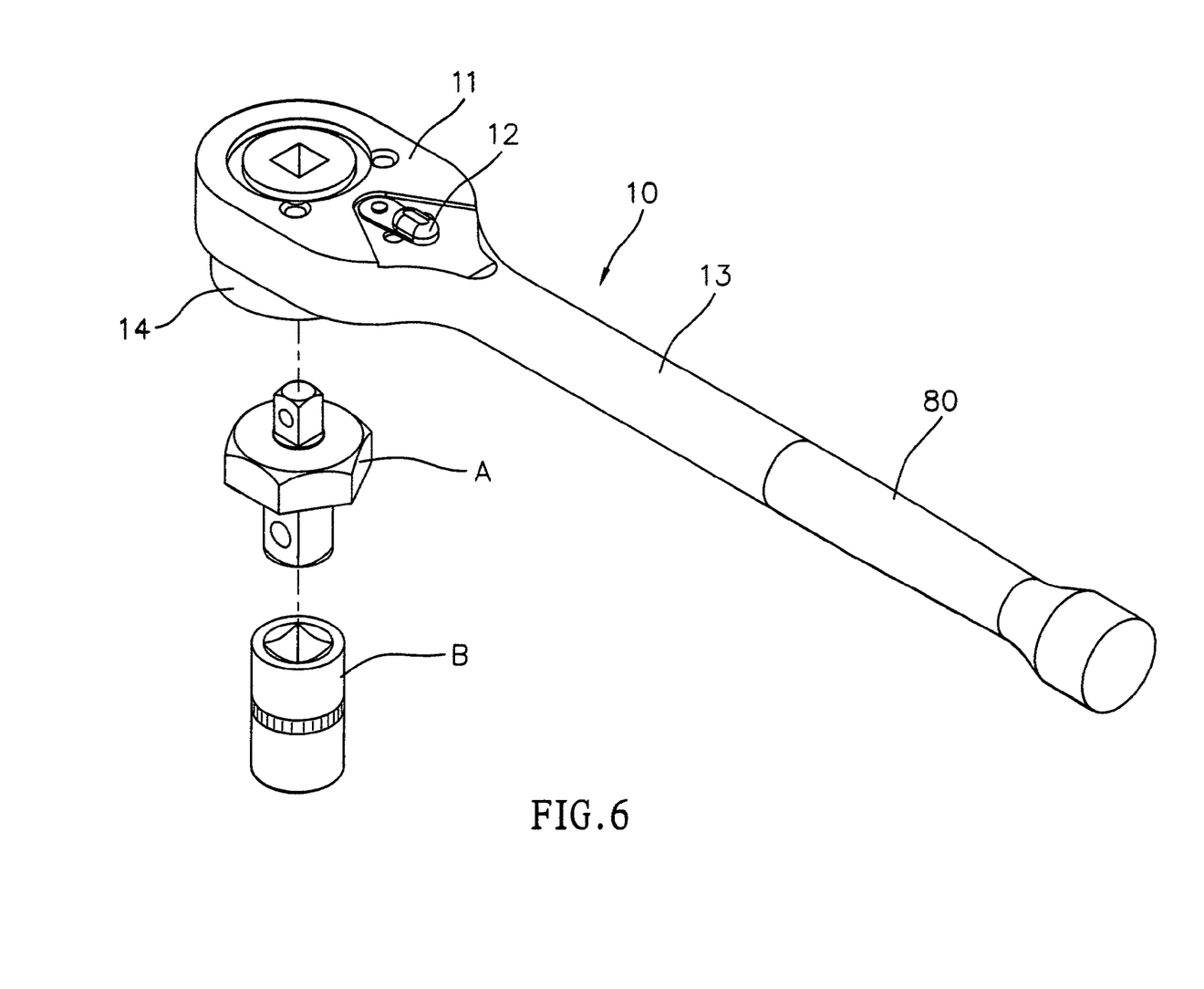
FIG. 6 is an exploded view to show the ratchet tool of the present invention, an adapter and a socket.

When the ratchet tool 10 is used to fasten or loosen an object, as shown in FIG. 6, the first connection portion 14 is connected with an adapter "A" and a socket "B" is connected to the adapter "A". Of course, the adapter "A" can be designed to be connected with a bit.

Figure 7:
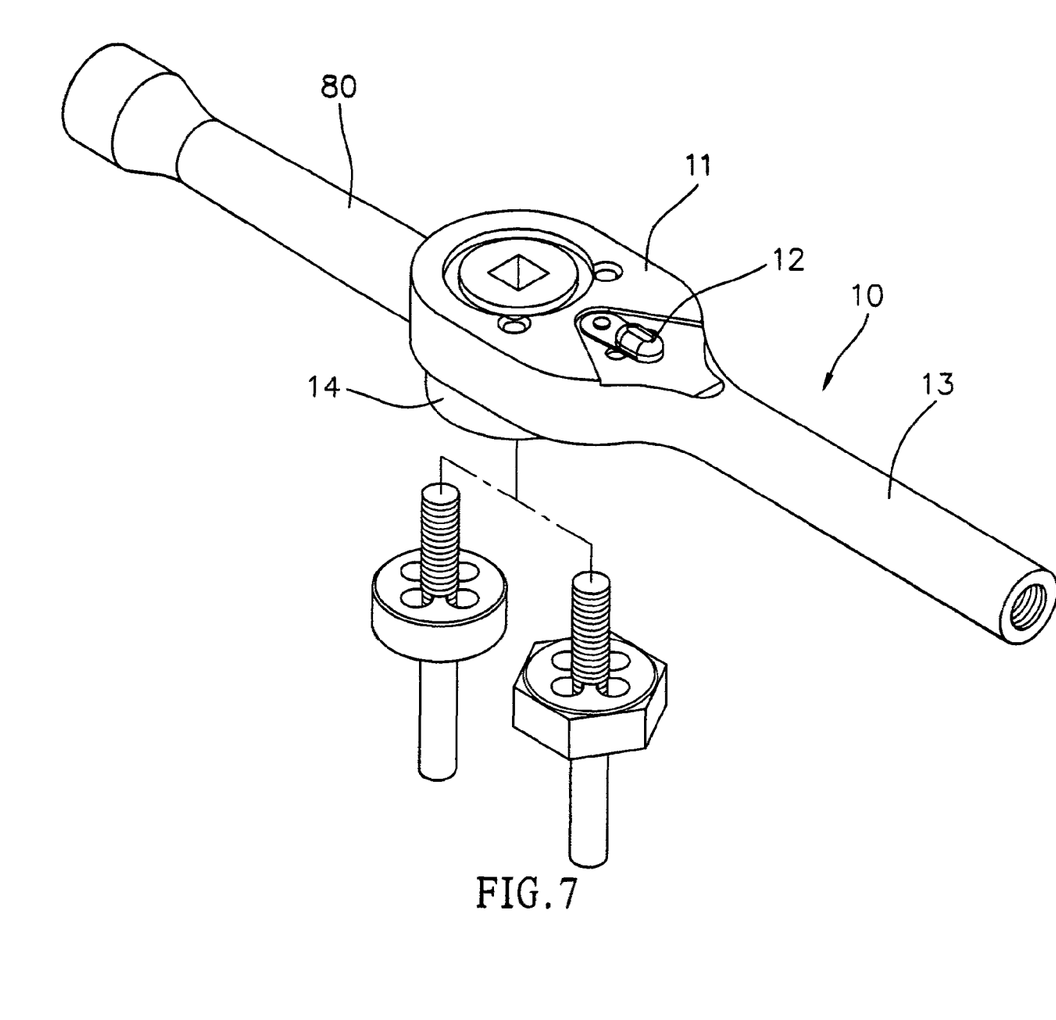
FIG. 7 shows another type of thread forming rap and the ratchet tool of the present invention.

FIG. 7 shows that another type of thread forming rap can also be connected to the ratchet tool 10 of the present invention if the recess in the first connection member 14 is a circular recess.

The ratchet tool 10 has two different functions which is cooperated with a thread forming tap and a socket or bit.

While we have shown and described the embodiment in accordance with the present invention, it should be clear to those skilled in the art that further embodiments may be made without departing from the scope of the present invention.

What is claimed is:

1. A ratchet tool comprising:

a head and a handle extending from a first end of the head, a first connection portion connected to a first side of the head;

a connection member having a second connection portion on a first side thereof and the second connection portion connected to the first connection portion, a passage defined through the connection member and a slot defined in a second side of the connection member, two parts being formed and separated by the slot, each of the two parts having a recess defined therein, two guide grooves defined in two insides of the slot;

a first block having a first rail which is slidably engaged with one of the two guide grooves so that the first block is movably located in the slot, the first block having a first face defined in an end thereof, a first pin extending through a first pin hole in the first block;

a second block having a second rail which is slidably engaged with the other one of the two guide grooves so that the second block is movably located in the slot, the second block having a second face defined in an end thereof, a second pin extending through a second pin hole in the second block;

a ring threadedly connected to outside of the connection member;

a cover having a hole defined centrally therethrough and including two guide ways, the first and second pins slidably extending through the two guide ways, and two biasing sets received in the recesses and contacting the cover.

2. The ratchet tool as claimed in claim 1, wherein each of the guide ways is a curved way.

3. The ratchet tool as claimed in claim 1, wherein each of the biasing sets includes a resilient member and a contact member, the resilient member biases the contact member which contacts the cover.

4. The ratchet tool as claimed in claim 3, wherein the resilient member is a spring.

5. The ratchet tool as claimed in claim 3, wherein the contact member is a ball.

6. The ratchet tool as claimed in claim 1, wherein an extension rod includes a threaded section extending from an end thereof and a threaded hole is defined in a second end of the head, the threaded section is threadedly connected to the threaded hole.

7. The ratchet tool as claimed in claim 1, wherein the first connection portion has a hexagonal recess and the second connection portion is a hexagonal protrusion.

\* \* \* \* \*